(12) United States Patent
Müller et al.

(10) Patent No.: US 12,520,047 B2
(45) Date of Patent: Jan. 6, 2026

(54) RECORDING AND BRIGHTNESS ADJUSTMENT OF AN IMAGE

(71) Applicant: SICK AG, Waldkirch (DE)

(72) Inventors: Romain Müller, Waldkirch (DE); Pascal Schüler, Waldkirch (DE)

(73) Assignee: SICK AG, Waldkirch (DE)

( * ) Notice: Subject to any disclaimer, the term of this patent is extended or adjusted under 35 U.S.C. 154(b) by 343 days.

(21) Appl. No.: 18/133,705

(22) Filed: Apr. 12, 2023

(65) Prior Publication Data
US 2023/0370724 A1 Nov. 16, 2023

(30) Foreign Application Priority Data

May 13, 2022 (EP) .................................... 22173324

(51) Int. Cl.
*H04N 23/71* (2023.01)
*H04N 23/80* (2023.01)

(52) U.S. Cl.
CPC ............. *H04N 23/71* (2023.01); *H04N 23/80* (2023.01)

(58) Field of Classification Search
CPC ........ H04N 23/71; H04N 23/80; H04N 23/64; H04N 23/61; H04N 23/70; G06T 5/40;
(Continued)

(56) References Cited

U.S. PATENT DOCUMENTS

| 2005/0103860 | A1* | 5/2005 | Zhu | G06K 7/10851 |
| | | | | 235/462.31 |
| 2016/0119525 | A1* | 4/2016 | Wolf | G03B 7/17 |
| | | | | 348/234 |

(Continued)

FOREIGN PATENT DOCUMENTS

| EP | 0366099 B1 | 1/1996 |
| EP | 1359746 A1 | 5/2003 |

(Continued)

OTHER PUBLICATIONS

Zhuang, Image Enhancement via Subimage Histogram Equalization Based on Mean and Variance, Computational Intelligence and Neuroscience, Dec. 18, 2017, vol. 2017, Hindawi Limited, London, United Kingdom.

(Continued)

*Primary Examiner* — Hung H Lam
(74) *Attorney, Agent, or Firm* — Nath, Goldberg & Meyer; Jerald L. Meyer

(57) ABSTRACT

A camera device having an image sensor for recording an image and having a control and evaluation unit configured to subdivide the image into first subregions, to find a second subregion in the image with structures of interest, and to carry out a brightness adjustment of the image, wherein the control and evaluation unit is further configured to determine a respective brightness distribution for the first subregions, to determine a selection of those first subregions that correspond to the second subregion, to generate a common brightness distribution of the second subregion from the brightness distributions of the first subregions of the selection, and to use the common brightness distribution to carry out the brightness adjustment for the second subregion.

19 Claims, 2 Drawing Sheets

(58) Field of Classification Search
CPC ............ G06T 5/94; G06T 2207/20021; G06K 7/1404; G06V 10/25; G06V 2201/06; G06V 10/50; G06V 10/54; G06V 10/22
See application file for complete search history.

(56) References Cited

U.S. PATENT DOCUMENTS

| | | | |
|---|---|---|---|
| 2016/0358338 A1* | 12/2016 | Tsunoda | G06V 10/462 |
| 2017/0061237 A1* | 3/2017 | Kobayashi | G06T 5/40 |
| 2020/0019743 A1* | 1/2020 | Lei | G06K 7/1443 |
| 2021/0248723 A1 | 8/2021 | Zhang | |

FOREIGN PATENT DOCUMENTS

| | | |
|---|---|---|
| EP | 1365577 A1 | 11/2003 |
| EP | 2003599 A1 | 12/2008 |
| EP | 2555160 B1 | 10/2013 |
| EP | 3495987 B1 | 8/2021 |
| EP | 3916633 A1 | 12/2021 |
| JP | 2006024176 A | 1/2006 |
| JP | 2015032966 A | 2/2015 |

OTHER PUBLICATIONS

European Search Report for corresponding application 22173324.9 issued Oct. 7, 2022.

\* cited by examiner

RECORDING AND BRIGHTNESS ADJUSTMENT OF AN IMAGE

FIELD

The invention relates to a camera device and a method for recording and adjusting brightness of an image.

BACKGROUND

In industrial applications, cameras are used in a variety of ways to automatically detect object properties, for example for inspecting or measuring objects. Images of the object are captured and evaluated by image processing methods according to the task. Another application of cameras is the reading of codes. Objects bearing the codes are recorded using an image sensor, the code areas in the images are identified and then the codes are decoded. Camera-based code readers can easily cope with code types other than one-dimensional bar codes that have a two-dimensional structure, like a matrix code, and provide more information. The automatic text detection of printed addresses (OCR, Optical Character Recognition) or handwriting is also, in principle, code reading. Typical areas of application for code readers are supermarket checkouts, automatic package identification, sorting of postal items, baggage handling at airports and other logistics applications.

A common acquisition situation is the mounting of the camera above a conveyor belt. The camera takes images during the relative movement of the object stream on the conveyor belt and initiates further processing steps depending on the detected object properties. The processing steps consist, for example, in further processing adapted to the specific object on a machine acting on conveyed objects, or in a change of the object stream in that certain objects are ejected from the object stream as part of a quality control, or the object stream is sorted into several partial object streams. If the camera is a camera-based code reader, the objects are identified by the attached codes for correct sorting or similar processing steps.

Thanks to advancements in camera and image sensor technology, the images to be processed are getting larger and larger. The immense amounts of data pose challenges to the limited computing capacities and bandwidths for forwarding and processing in a camera under real-time conditions. The use of heterogeneous computing architectures, i.e. a network of a microprocessor (CPU, Central Processing Unit) with, for example, an FPGA (Field Programmable Gate Array), a DSP (Digital Signal Processor), a GPU (Graphics Processing Unit) or also a so-called AI accelerator (NPU, Neural Processing Unit, TPU, Tensor Processing Unit) supports this.

The combination with an FPGA that is responsible for reading out the image data from the image sensor has proved particularly successful. The FPGA is also connected to a memory of the microprocessor via a high-speed interface (PCI, Peripheral Component Interconnect, PCIE, PCI Express, MIPI, Mobile Industry Processor Interface). In this way, the image data is transferred from the FPGA to the memory via DMA (Direct Memory Access). This process of reading and storing is called streaming. The CPU-implemented decoder can then access the stored images downstream and read out the codes. The streaming approach is not easily possible with other additional components of a heterogeneous architecture mentioned above, that would usually require an already stored image, whereas the FPGA can read out and process image data directly on a pixel-by-pixel basis.

The image data preferably is already preprocessed directly, on-the-fly, in the FPGA, and additional information or metadata for the microprocessor can be stored with the image data. Typical preprocessing steps include binarization, which turns a gray-scale image into a black-and-white image, or segmentation, wherein regions of interest (ROI) with code candidates are located. For example, EP 2 003 599 A1 describes an optoelectronic sensor and a method for detecting codes, wherein a binarizer is configured for converting a color or gray-scale image into a binary image already during reception and/or in real time by binarizing a respective section during read-in while the other sections are still being read in. EP 2 555 160 B1 locates regions of interest or code candidates in a preprocessing on an FPGA based on a contrast measure. In EP 3 916 633 A1, first layers of a neural network for segmentation are already processed on an FPGA during read-in. EP 1 365 577 A1 discloses a method for operating an optoelectronic sensor wherein an image is already compressed during reception. In each case, the FPGA's ability to perform many simple computing operations, such as matrix multiplications, in parallel in real time is exploited. Sequential, more complex computing operations, such as those of a decoder for reading optical codes, are the domain the microprocessor that makes use of the image data and possible preprocessing results provided.

One useful preprocessing is a so-called contrast spreading. It improves downstream image processing, in particular the reading of codes, if the brightness or gray value range is not utilized during image acquisition. Possible causes are underexposure, a dark background or, in the case of codes, poor printing. In contrast spreading, the recorded brightness values are rescaled or spread to the available dynamic or gray value range, for example of eight bits. A problem is that the brightness distribution must be known for contrast spreading, and this is very costly in terms of computation because the individual pixels must be accessed. In principle, the FPGA could step in and efficiently determine the brightness distribution. However, this would be a global brightness distribution, and contrast spreading on that basis is of little use for heterogeneous images having bright regions and dark regions. In particular, for code reading, it is even the usual case that the regions of interest are bright labels in front of dark backgrounds of an object bearing the labels or of a conveyor belt. Only contrast spreading limited to a region of interest could really lead to an improvement, but a global brightness distribution cannot be used for that purpose.

EP 0 366 099 B1 discloses a computationally efficient technique for image contrast enhancement. A histogram is formed from the brightness values of the pixels and a transfer function is formed on that basis that subsequently is used to adjust the original brightness values. EP 1 359 746 A1 deals with an image processing device that also builds up a histogram in order to find the smallest and largest brightness values and to spread the image signal on this basis. Only a global contrast spread is achieved in both documents. EP 3 495 987 B1 describes a method for reading barcodes wherein the contrast is adjusted locally from histograms of a neighborhood. This makes it necessary to again and again generate local histograms for the respective pixel to be corrected with high computational costs.

The paper by Zhuang, Liyun, and Yepeng Guan, "Image enhancement via subimage histogram equalization based on mean and variance", Computational intelligence and neuroscience 2017 (2017) describes a method wherein a histogram of an input image is divided into four parts. This subdivision relates to the histogram, not to the input image, and thus does not allow for local contrast spreading.

SUMMARY

It is therefore an object of the invention to improve a brightness adjustment for a captured image.

This object is satisfied by a camera device having an image sensor for recording an image and having a control and evaluation unit configured to subdivide the image into first subregions, to find a second subregion in the image with structures of interest, and to carry out a brightness adjustment of the image, wherein the control and evaluation unit is further configured to determine a respective brightness distribution for the first subregions, to determine a selection of those first subregions that correspond to the second subregion, to generate a common brightness distribution of the second subregion from the brightness distributions of the first subregions of the selection, and to use the common brightness distribution to carry out the brightness adjustment for the second subregion.

The object is also satisfied by a method for recording and adjustment of brightness of an image, wherein the recorded image is subdivided into first subregions, and a second subregion with structures of interest is found in the image, wherein a respective brightness distribution is determined for the first subregions, a selection of those first subregions is determined that correspond to the second subregion, a common brightness distribution of the second subregion is generated from the brightness distributions for the first subregions of the selection, and the brightness adjustment for the second subregion is carried out with the common brightness distribution.

An image sensor records an image or image data with a plurality of pixels, typically in high resolution with a line sensor having several kilopixels or a matrix sensor having several megapixels. A control and evaluation unit subdivides the image into a plurality of first subregions. This subdivision is an a priori subdivision into first subregions of a given position and geometry, independent of the image content, in particular in a fixed grid of equally sized rectangles of n×m pixels. The first subregions will be referred to synonymously as tiles throughout the remainder of this specification. For example, the image is divided into at least five, at least ten or even more tiles per row or column.

In addition, a second subregion with structures of interest is found in the image. Such structures of interest can be objects, labels, optical codes, inscriptions and other image contents that are of interest for the application of the camera device. In contrast to the division into first subregions, the position and geometry of the second subregion thus depend on the image content. The second subregions are regions of interest (ROI) and will be referred to as such synonymously in the following. Whether there is one or more second subregions depends on the current scenery at the time of image acquisition. If there are no second subregions in an image at all, further processing of that image can be aborted. Finding or locating the second subregion or subregions corresponds to the segmentation discussed in the introduction, and all segmentation methods known per se can be used for this purpose.

The control and evaluation unit also carries out a brightness adjustment of the image, in particular a contrast spreading. The invention starts from the basic idea that the brightness adjustment is not carried out for the entire image, but for the second subregion or the second subregions or the regions of interest. A brightness distribution is determined for each of the first subregions or tiles. After this step, a large number of local brightness distributions are known.

A selection of those first subregions is determined that correspond to the second subregion. More clearly, these are the tiles that cover a region of interest. As a rule, edge effects occur because an edge of the second subregion may not be covered by a first subregion, or at least not everywhere, or conversely a first subregion overlaps the edge of the second subregion. It is conceivable to have too many tiles overlapping too generously, or to have too few tiles overlapping too sparingly, or even to have a mixed form that overlaps part of the edge and leaves out another part of the edge.

The brightness distributions of the selection of first subregions corresponding to the second subregion are combined to a common brightness distribution. This results in a common brightness distribution of the second subregion, but without the individual brightness values of the pixels having to be accessed again. The merging of the individual brightness distributions takes place on a more abstract level and is therefore associated with significantly less computational effort. The common brightness distribution is used to adjust the brightness for the second subregion. Preferably, no brightness adjustment takes place outside the second subregion, and in any case the brightness adjustment in the second subregion is based on a matching common brightness distribution and not on a global brightness distribution over the entire image. In the case of more than one second subregions in the same image, the corresponding steps are preferably repeated for the other second subregions. However, the brightness distributions for the first subregions need to be determined only once; they can be recombined in each case to form other common brightness distributions for the respective second subregion.

The invention has the advantage of enabling local brightness adjustment or contrast spreading that applies only to regions of interest. This contrast spreading is particularly computationally efficient because the brightness distributions to the individual tiles need to be determined only once, and this process is also independent of the regions of interest and can therefore be processed in advance or in parallel. Combining brightness distributions for the selected tiles to a common brightness distribution for the region of interest is not computationally intensive, it does not require to again access the individual pixel values in the region of interest. The brightness adjustment according to the invention, with the selection of the tiles, comes at least very close to a local contrast spreading that individually determines precisely fitting brightness distributions for a region of interest, while the high computational costs of a precisely fitting local contrast spreading are avoided. Implementations are possible that have virtually no impact on runtime and therefore do not compromise real-time capability even without expensive computing components. A brightness adjustment or contrast spreading in itself is advantageous for many subsequent image processing operations, such as edge detection and binarization, in particular in preparation of code reading.

The control and evaluation unit preferably is configured to select, when selecting first subregions corresponding to the second subregion, the first subregions which overlap with the second subregion by a predetermined minimum proportion. Thus, for the assignment of tiles to a region of interest, a criterion is specified that is local per tile and very easy to check, that also unambiguously determines the handling of the edges of the region of interest already discussed above. The minimum proportion is preferably specified as a percentage of the number of pixels in a tile and thus as an area proportion and is a parameter that can be chosen according to a generous or sparing coverage of the region of interest with tiles. Throughout this specification, the terms preferably or preferred refer to advantageous, but completely optional features.

The control and evaluation unit preferably is configured to determine respective brightness distributions for the first subregions and to find a second subregion with structures of interest in parallel. In the course of determining brightness distributions for the tiles, the tiles themselves can also be formed. It is only possible to find the regions of interest in parallel because the two steps are independent of each other. The regions of interest do not have to be known in advance, because the brightness distributions initially refer to the tiles. The assignment takes place only after this parallel processing, when tiles are assigned to the region of interest. Then, the costly determination of the brightness distributions has already been processed in parallel, and it is only the simple step of forming the common brightness distribution from the individual brightness distributions for the tiles selected according to the region of interest that is required.

The control and evaluation unit preferably is configured to determine the brightness distributions for the first subregions as histograms, in particular to form a common histogram as the sum of the histograms for the selection of the first subregions when generating the common brightness distribution. Brightness distributions are represented as histograms in this embodiment. A histogram can resolve the dynamic range with the highest fineness, corresponding to a bin width of one, for example 256 bins for 8-bit gray value acquisition of the image sensor. Alternatively, wider bins are selected, for example four adjacent gray levels are combined in one bin, which means that 64 bins are sufficient for an 8-bit gray value and the counts for the bins increase according to the wider bins. It is particularly easy to form a common histogram of the region of interest from the histograms for the tiles by adding up the counts per bin. However, also in other representations of the brightness distribution without histograms, it is possible with a few simple calculation steps to cumulate the respective frequencies in the common brightness distribution, and to renormalize the common brightness distribution if necessary.

The control and evaluation unit preferably is configured to spread a range of brightness of the common brightness distribution to a larger range of possible brightness values of the image for brightness adjustment, in particular by a linear rescaling of the brightness values. In this case, the brightness adjustment is a contrast spreading. The brightness values that actually occur are rescaled to a larger range or a larger proportion of the possible brightness values. It can be spread to the entire available dynamic range, or an edge range can be omitted. For example, for 8-bit gray level resolution, rescaling can be spread to values from 0 . . . 255 or only from i . . . (255−j), where i, j are small integers, such as i=j=15. The rescaling preferably is linear.

The control and evaluation unit preferably is configured to determine the range of brightness of the common brightness distribution based on a smallest and largest occurring brightness value of the brightness distribution. This is a very simple way to determine the range of actually occurring brightness values. It results in a smallest occurring brightness value MinGray and a largest occurring brightness value MaxGray, and the interval [MinGray, MaxGray] can then be spread to a larger interval such as [i, 255−j]. Preferably, bins with a particularly small count are set to zero before determining the smallest and largest occurring brightness values, so that single or a few noisy pixels with extreme gray values do not distort the result. Additionally or alternatively, for similar reasons, some darkest and brightest bins can be set to zero in advance, for example a total of 5%, 10% or 20% of the edges of the brightness distribution.

The control and evaluation unit preferably is configured to determine the range of brightness of the common brightness distribution based on maxima or peaks of the brightness distribution. This is particularly advantageous for reading optical codes where a dark and a light peak are expected, and it is precisely this binary contrast between dark and light that is important. The span does not have to result directly from the position of the peaks, but can still be narrowed or preferably be widened. Furthermore, it is conceivable to discard a particularly bright peak, for example with an 8-bit gray value resolution in a range above a value of 240, 245, 250 or 252, because it is probably an uninteresting gloss reflex, in particular if there is an additional slightly less bright peak and also a dark peak. The brightness distribution can be smoothed before peaks are found, for example with a Gaussian filter. It is conceivable to add the steps of the preceding paragraph and to consider the values MinGray, MaxGray when defining the span, for example to put the limits of the span between MinGray and a dark peak and between MaxGray and a bright peak, respectively, in particular in the respective center.

The control and evaluation unit preferably comprises a first processing unit that is responsible for the subdivision of the image into first subregions and the determination of the respective brightness distributions for the first subregions. These two steps require numerous pixel accesses with rather simple operations. The first processing unit preferably comprises an FPGA (Field Programmable Gate Array). An FPGA is particularly suitable for streaming image data and for real-time processing of large amounts of data with many, comparatively simple individual computing operations. The steps implemented on the first processing unit are not necessarily limited to forming tiles and generating associated brightness distributions. In particular, the first processing unit may also be responsible for finding the second subregions. For this purpose, a contrast measure can preferably be formed, because regions of interest with optical codes are distinguished by high contrast from rather homogeneous background. The segmentation with finding of regions of interest is known per se, it is referred in addition to the documents mentioned in the introduction. The regions of interest can alternatively be found in a completely different way, for example by 3D geometry measurement using another sensor, in particular a laser scanner, or using the camera device itself, for example to distinguish objects from the background.

The camera device preferably comprises a memory for storing image data, wherein the first processing unit is configured to transfer image data of the image from the image sensor to the memory in an image data stream. Reading and storing image data as an image data stream preferably in groups of adjacent pixels is referred to as streaming. In particular, the first processing unit reads one image line or part thereof at a time from the image sensor and stores it in the memory. Accordingly, the image is read in or streamed from the image sensor line by line, and the processing is line-oriented. For preprocessing operations involving more than one image line, the first processing unit may comprise an image buffer in which a required number of image lines are temporarily stored on a rolling basis. For the determination of the tiles and associated brightness distributions, an image buffer may be used, but is not necessary. In principle, it is also possible to work with image columns instead of image lines in the same way. This is only understood as a difference in the definition of the coordinates and is not differentiated here.

The first processing unit preferably is configured to process respective image data read in from the image sensor already during transfer to the memory while further image data is still being read in from the image sensor. The first processing unit is thus configured for preprocessing "on-the-fly" or already during streaming. Processed image data or additional information or metadata obtained during preprocessing are stored. This preprocessing is performed directly at the source and before any downstream image processing, in particular a decoder for reading optical codes, has even gained access to the image data. The preprocessing preferably concerns the subdivision into tiles or the determination of associated brightness distributions, possibly also the finding of structures of interest or regions of interest, in particular an assessment of the respective contrast or the determination of auxiliary variables such as mean value and variance for subsequent assessment of the contrast.

The control and evaluation unit preferably is configured to read the content of an optical code in the second subregion. The camera device thus becomes a camera-based code reader. The structures of interest in this case are optical codes, for example barcodes or 2D codes according to any standard. The image contents of a region of interest are fed to a decoder that attempts to read out the contents of the optical code using at least one decoding method known per se and therefore not explained in any detail.

The control and evaluation unit preferably comprises a second processing unit, in particular a microprocessor (CPU). As already mentioned, the first processing unit and in particular an FPGA is particularly suitable for streaming as well as for real-time processing of large amounts of data with comparatively simple individual computing operations. A CPU, on the other hand, is much more flexible and capable of more complex computing steps on its own, and this is advantageous for downstream image processing.

The second processing unit preferably is configured to process the brightness-adjusted image data of the second subregion, in particular to read the content of optical codes in the second subregion. The second processing unit thus uses the result of the brightness adjustment according to the invention for the actual image evaluation. It can access the image data streamed into the memory and preprocessed by the first processing unit, including possible metadata. Preferably, the determination of matching tiles to a region of interest as well as the combination of the brightness distributions of these tiles to the common brightness distribution is also done in the second processing unit. Alternatively, this step may also be performed by the first processing unit, or both processing units share this task.

The control and evaluation unit preferably is configured to generate, on the basis of the common brightness distribution, a lookup table for the brightness adjustment that assigns adjusted brightness values to original brightness values. That lookup table (LUT) contains brightness-adjusted or contrast-spread brightness values associated with the occurring brightness values. In particular, as described above, an interval or range of occurring brightness values is spread, preferably linearly, to a larger interval or range of possible brightness values. The lookup table simplifies the subsequent conversion of brightness values to only one table access. Generating the lookup table is generally assigned to the control and evaluation unit; in various embodiments, the first processing unit and/or the second processing unit may be responsible for this.

The control and evaluation unit preferably comprises a second processing unit configured to read image data of the second portion via the lookup table. Using a simple indirection via the lookup table, the contrast spreading is already done. The second processing unit therefore does not have to read in a pixel value specifically for the brightness adjustment; the brightness adjustment is integrated with minimal effort when the second processing unit's preferably only pixel access for the actual image processing occurs. The image data to be read in is preferably previously streamed into the memory by the first processing unit.

The method according to the invention can be modified in a similar manner and shows similar advantages. Further advantageous features are described in an exemplary, but non-limiting manner in the dependent claims following the independent claims.

BRIEF DESCRIPTION OF THE DRAWINGS

The invention will be explained in the following also with respect to further advantages and features with reference to exemplary embodiments and the enclosed drawing. The Figures of the drawing show in.

DETAILED DESCRIPTION

Figure 1:
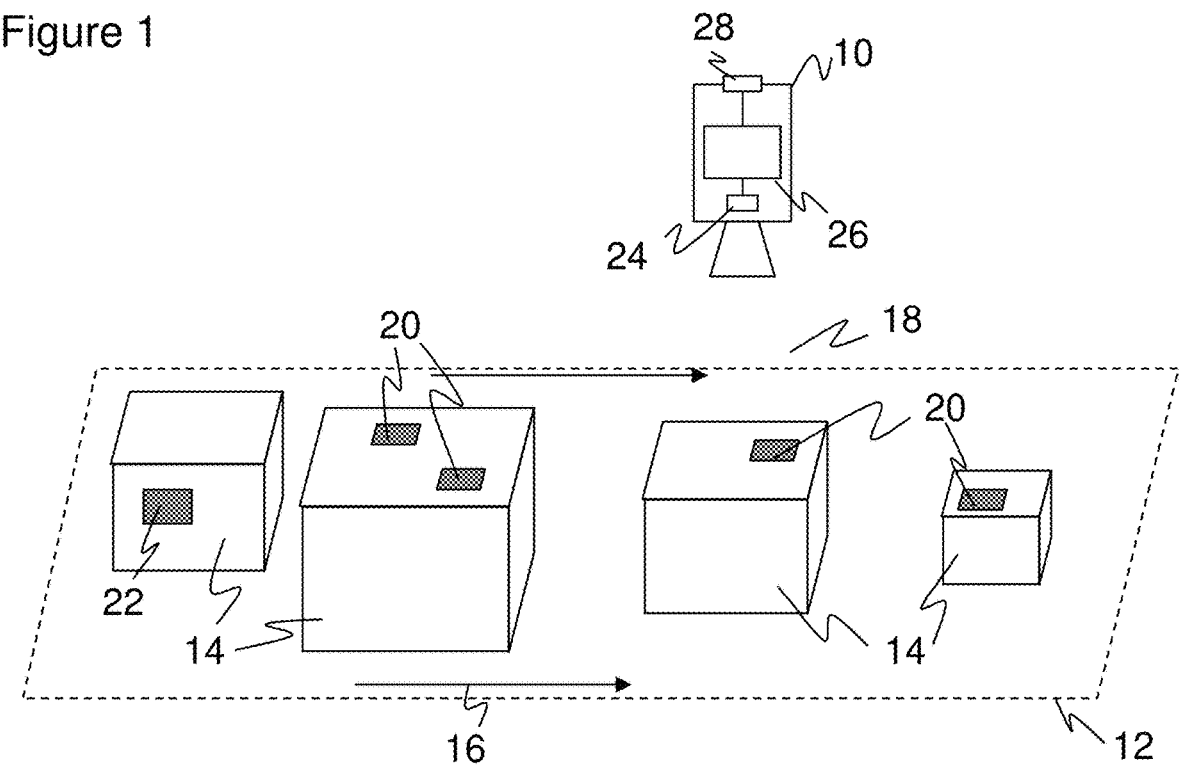
FIG. 1 a schematic overview of an exemplary mounting of a camera device above a conveyor belt.

FIG. 1 shows a camera 10, in particular a camera-based code reader, mounted above a conveyor belt 12 that conveys objects 14, as indicated by the arrow 16, through a detection region 18 of the camera 10. In the example code reading application, the objects 14 comprise codes 20 on their outer surfaces that are detected and evaluated by the camera 10. The codes 20 can only be detected by the camera 10 if they are attached to the upper side or at least visible from above. Therefore, in deviation from the illustration in FIG. 1, a plurality of cameras 10 can be mounted from different directions for reading a code 22 attached to, for example, the side or bottom, in order to enable so-called omni-reading from all directions. This stationary application of a camera on a conveyor belt 12 is very important in practice. However, the invention relates to the processing of image data or the camera 10 itself, so that this example, like the code reading application, must not be understood in a limiting manner.

The camera 10 captures image data of the conveyed objects 14 and the codes 20 using an image sensor 24, which image data are further processed by a control and evaluation unit 26 using image evaluation, including a decoding process in the case of code reading. The control and evaluation unit 26 will be described in more detail shortly with reference to FIG. 2. Via an interface 28, the camera 10 outputs information, such as image data possibly in various stages of processing, or codes that have been read.

Figure 2:
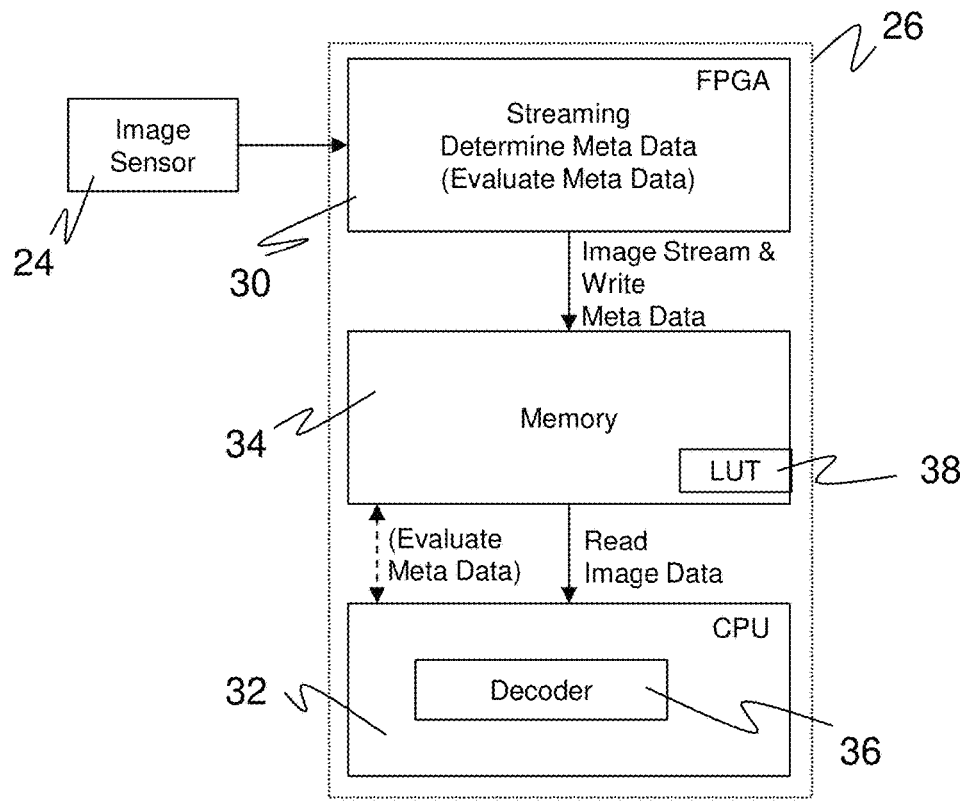
FIG. 2 a schematic representation of a heterogeneous architecture for image evaluation and brightness adjustment with an FPGA as a streamer and a CPU for further image processing or as a decoder.

FIG. 2 shows the control and evaluation unit 26 and its connection in a schematic representation. This representation shows an advantageous embodiment; in general, a control and evaluation unit 26 of any internal structure with any digital computing component can read out the image data of the image sensor 24 and process them in the manner to be described. The control and evaluation unit 26 in the preferred embodiment according to FIG. 2 comprises a first processing unit 30, explained below using the example of an FPGA (Field Programmable Gate Array), and a second processing unit 32, explained below using the example of a microprocessor or CPU (Central Processing Unit). The second processing unit 32 preferably includes a decoder 36 for reading optical codes based on image data.

The first processing unit 30 is on the one hand connected to the image sensor 24 and on the other hand has an interface in the direction of the second processing unit 32, preferably a high-speed interface (PCI, PCIE, MIPI). Both processing units 30, 32 can access a memory 34 for image data and additional information, metadata or processing results. The corresponding read and write operations are preferably performed using DMA (Direct Memory Access). The memory 34 can be understood at least functionally, and depending on the embodiment also structurally, as part of the second processing unit 32.

In operation, the image sensor 24 records a respective new image or new image section. This can be a rectangular image of a matrix sensor, but individual or multiple image lines of a line sensor are also conceivable, which then successively generate an overall image in the course of the relative movement between camera 10 and object 14. The image data of the image sensor 24 are read out by the first processing unit 30 and transferred or streamed into the memory 34. Preferably, additional information or metadata is determined at the same time, and advantageously "on-the-fly", i.e. directly during transfer to the memory 34 and while further image data of the image are to be read in or are being read in by the image sensor 24. The metadata may relate to various preprocessing operations which are not described in detail. This is because, in the context of the invention, it is of particular interest to subdivide an image into tiles and determine brightness distributions for the tiles and possibly to find regions of interest of an image, for example using codes 20. Determining the regions of interest may alternatively be performed in the second processing unit 32. These tasks or processing steps will be explained in more detail later with reference to FIGS. 3 and 4.

The second processing unit 32 accesses the image data in the memory 34 for further processing. Preferably, a decoder 36 of the second processing unit 32 reads out the contents of the optical codes 20 recorded with the image data. The second processing unit 32 is also capable of evaluating metadata stored in the memory 34 by the first processing unit 30. In particular, a lookup table 38 (LUT, LookUp Table) for a brightness adjustment or contrast spread can be generated in this way, which is stored in the memory 34. The brightness adjustment relates to a region of interest in the image and is performed based on the previously determined brightness distributions for the tiles. This will also be explained in more detail shortly with reference to FIGS. 3 and 4. Metadata may also be relied upon to locate regions of interest, although regions of interest may alternatively be determined in an entirely different manner, like using an external sensor such as a laser scanner to measure the geometry and thus detect the objects 14 against their background. The evaluation of metadata can already be done at least partially in the first processing unit 30, for this reason of the different possible task distributions this processing step is shown in brackets in FIG. 2.

Figure 3:
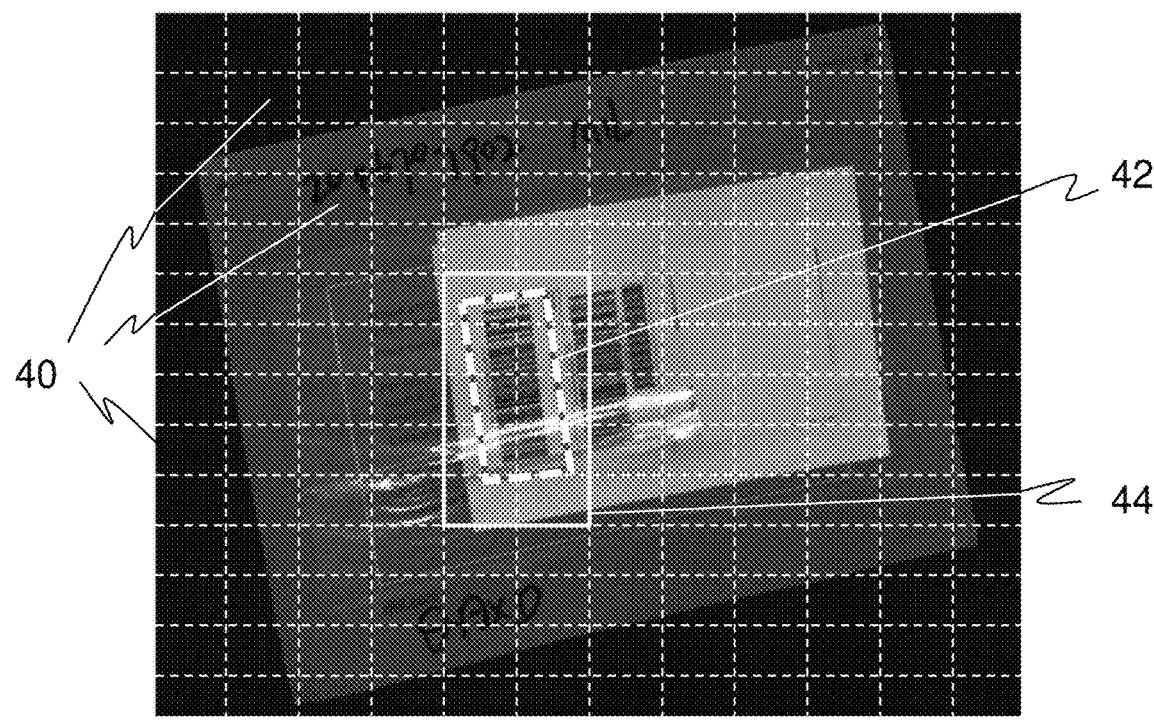
FIG. 3 an example image with optical codes, a subdivision into tiles, and a region of interest with an optical code.

FIG. 3 shows an example image with optical codes as captured by the camera 10. The image is divided into tiles 40, preferably as shown in a uniform grid of n×m pixels, where n and m are predetermined to generate a plurality of tiles per row and column. Metadata can be determined for each tile 40, for example mean or variance, which can be used to judge whether the respective tile 40 contains a structure of interest such as an optical code. For brightness adjustment according to the invention, a respective brightness distribution is determined for the tiles 40, in particular in the form of a histogram that bundles the possible gray values into bins and counts in the bins how many pixels with the gray value or values of the bin occur in a tile 40. As explained with reference to FIG. 2, such processing steps are possible on-the-fly during streaming. In principle, it is conceivable to include only a sample of the pixels in the brightness distribution to reduce the effort, but preferably at least a representative part, a majority or nearly all pixels contribute to obtain a meaningful brightness distribution.

Independent of the subdivision into tiles 40, the image is searched for regions of interest 42, in this case those with an optical code. The subdivision into tiles 40 with determination of respective brightness distributions and the search for regions of interest 42 can take place in parallel, since the finding of regions of interest 42 can be based on image data without brightness adjustment. However, it is still conceivable to perform the finding of regions of interest 42 only subsequently in the second processing unit 32. The search for regions of interest 42 may use the metadata discussed in the previous paragraph, but other segmentations are also known. It depends on the image whether there are one or more such regions of interest 42 or possibly no region of interest 42 at all, for example because the image does not contain optical codes. In the example image of FIG. 3, further optical codes are recognizable, which are not marked for the sake of clarity.

Knowing the region of interest 42, associated tiles 40 are determined. A corresponding selection 44 of tiles 40 overlaps the region of interest 42, and a decision must be made as to how to handle tiles in edge locations 42. In the example of FIG. 3, the selection 44 includes all tiles 40 that somehow overlap with the region of interest. Alternatively, it is conceivable to at least partially exclude tiles 40 at the edge. For this purpose, a minimum percentage of overlap may be required, such as a percentage threshold p %, and only tiles having at least this amount of overlap are included in the selection 44. For example, a threshold of 50% would drop the bottom two tiles 40 and possibly more tiles from the selection 44. The representation corresponds to a small threshold value of less than 10%, resulting in a more generous selection.

From the individual brightness distributions for the tiles 40 of the selection 44, a common brightness distribution for the region of interest 42 can now be determined by combining them. In a representation as a histogram, the counts simply need to be added up. The combination does not require much computational effort, access to individual pixels is no longer necessary for this step. The common brightness distribution does not fit exactly to the region of interest 42, because the tiles 40 usually do not exactly cover the region of interest 42 due to the mentioned edge effects, but it is a very good approximation.

Figure 4:
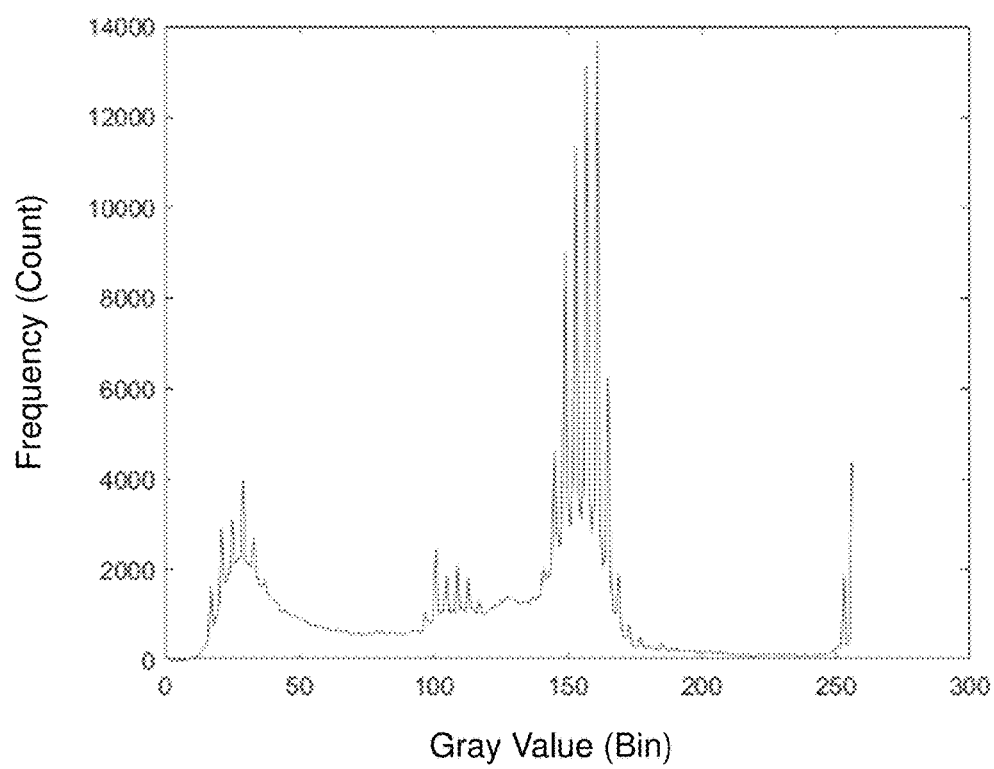
FIG. 4 an example histogram of gray values in an image or image section to explain contrast spreading.

FIG. 4 shows an exemplary brightness distribution in the form of a histogram. The bins of the possible gray values are shown on the X axis and the corresponding counts on the Y axis. This is a common brightness distribution of a region of interest, but the brightness distribution of a single tile 40 would look quite similar, it would just contain fewer counts, since usually a region of interest 42 is composed of multiple tiles 40. In this example, the gray values are resolved into 8 bits, and the bin width corresponds to a maximum resolution of one, so there are 256 bins. Alternatively, the bins may combine multiple gray values, for example into 64 bins of width four corresponding to a 6-bit gray value resolution, which would increase the counts. No further metadata is required for brightness adjustment beyond the common brightness distribution, which is combined from the individual brightness distributions for the tiles 40 of the selection 44.

For contrast spreading, the histogram is analyzed. In a simple embodiment, the smallest and largest occurring brightness value is determined, i.e. the smallest and largest bin with count not equal to zero. The upper and lower end of the histogram may be truncated, typically discarding 10%-20% or 15%-20% of the histogram. This eliminates noise in the dark area and gloss in the bright area, respectively. Furthermore, it is conceivable to require a minimum value, for example from two to ten, for the smallest and largest occupied bin, respectively, instead of just a non-zero count, so that individual outliers among the pixels do not distort the contrast spread. A particularly simple alternative embodiment simply selects a dark and light value corresponding to 80%-90%, 85%-90%, or some other predetermined proportion of the histogram, regardless of the occupancy of the bins. The result of the respective evaluation is a range [MinGray, MaxGray] of actually occurring (relevant) gray values.

In a somewhat more sophisticated analysis, maxima or peaks are determined in the histogram. In FIG. 4, there are peaks at gray levels 35, 110, 160 and 255. Prior to determining peaks, the histogram can be smoothed, for example with a Gaussian filter. In an optical code, there should be a peak for bright code areas and a peak for dark code areas. Therefore, the two most pronounced peaks are determined. The peak around 255 indicates gloss and can be discarded, preferably checking the additional condition that two peaks still remain, here at 35 and 160. Again, this results in a range [MinGray, MaxGray], which can be set at [35, 160]. Alternatively, both limits are shifted somewhat, for example to include the peaks in their entirety or to take into account an evaluation according to the previous paragraph.

There is thus known an actual range [MinGray, MaxGray] that now is spread to the entire gray value range of, for example, [0, 255] at 8-bit gray value resolution, or to an artificially somewhat smaller selected range [i, 255−j], with i, j small integers. Accordingly, in a brightness adjustment or contrast spreading, the gray values of the pixels in the range of interest 42 can be rescaled, in particular linearly.

The conversion is preferably performed by generating a lookup table 38 (LUT). In this table, the corresponding brightness-adjusted gray value can be read out directly for each actual gray value of the original image. When the second processing unit 32 or its decoder 36 loads image contents, i.e. accesses pixels of the region of interest 42, this can be done via the lookup table 38. Thus, after streaming with preprocessing by the first processing unit 30, individual pixels are accessed again only for the actual downstream image processing and in particular for reading codes. Their brightness values are already brightness-adjusted or contrast-spread with minimal effort of indirection via the lookup table.

The invention claimed is:

1. A camera device having an image sensor for recording an image and having a control and evaluation unit configured to subdivide the image into first subregions, to find a second subregion in the image with structures of interest, and to carry out a brightness adjustment of the image,
wherein the control and evaluation unit is further configured to determine a respective brightness distribution for the first subregions, to determine a selection of those first subregions that correspond to the second subregion, to generate a common brightness distribution of the second subregion from the brightness distributions of the first subregions of the selection, and to use the common brightness distribution to carry out the brightness adjustment for the second subregion,
wherein the control and evaluation unit is configured to spread a range of brightness of the common brightness distribution to a larger range of possible brightness values of the image for brightness adjustment,
and wherein the control and evaluation unit is configured to spread the range of brightness by a linear rescaling of the brightness values.

2. The camera device according to claim 1, wherein the control and evaluation unit is configured to select, when selecting first subregions corresponding to the second subregion, the first subregions which overlap with the second subregion by a predetermined minimum proportion.

3. The camera device according to claim 1, wherein the control and evaluation unit is configured to determine respective brightness distributions for the first subregions and to find a second subregion with structures of interest in parallel.

4. The camera device according to claim 1, wherein the control and evaluation unit is configured to determine the brightness distributions for the first subregions as histograms.

5. The camera device according to claim 4, wherein the control and evaluation unit is configured to form a common histogram as the sum of the histograms for the selection of the first subregions when generating the common brightness distribution.

6. The camera device according to claim 1, wherein the control and evaluation unit is configured to determine the range of brightness of the common brightness distribution based on at least one of a smallest and largest occurring brightness value of the brightness distribution and maxima of the brightness distribution.

7. The camera device according to claim 1, wherein the control and evaluation unit comprises a first processing unit that is responsible for the subdivision of the image into first subregions and the determination of the respective brightness distributions for the first subregions.

8. The camera device according to claim 7, wherein the first processing unit comprises a FPGA (Field Programmable Gate Array).

9. The camera device according to claim 7, comprising a memory for storing image data, wherein the first processing unit is configured to transfer image data of the image from the image sensor to the memory in an image data stream.

10. The camera device according to claim 7, wherein the first processing unit is configured to process respective image data read in from the image sensor already during transfer to the memory while further image data is still being read in from the image sensor.

11. The camera device according to claim 1, wherein the control and evaluation unit is configured to read the content of an optical code in the second subregion.

12. The camera device according to claim 1, wherein the control and evaluation unit comprises a second processing unit.

13. The camera device according to claim 12, wherein the second processing unit comprises a microprocessor.

14. The camera device according to claim 12, wherein the second processing unit is configured to process the brightness-adjusted image data of the second subregion.

15. The camera device according to claim 14, wherein the second processing unit is configured to read the content of optical codes in the second subregion.

16. The camera device according to claim 1, wherein the control and evaluation unit is configured to generate, on the basis of the common brightness distribution, a lookup table for the brightness adjustment that assigns adjusted brightness values to original brightness values.

17. The camera device according to claim 16, wherein the control and evaluation unit comprises a second processing unit configured to read image data of the second portion via the lookup table.

18. A method for recording and adjusting brightness of an image,
wherein the recorded image is subdivided into first subregions, and a second subregion with structures of interest is found in the image, wherein a respective brightness distribution is determined for the first subregions, a selection of those first subregions is determined that correspond to the second subregion, a common brightness distribution of the second subregion is generated from the brightness distributions for the first subregions of the selection, and the brightness adjustment for the second subregion is carried out with the common brightness distribution, comprising:
spreading a range of brightness of the common brightness distribution to a larger range of possible brightness values of the image for brightness adjustment; and
determining the range of brightness of the common brightness distribution based on at least one of a smallest and largest occurring brightness value of the brightness distribution and maxima of the brightness distribution.

19. A camera device having an image sensor for recording an image and having a control and evaluation unit configured to subdivide the image into first subregions, to find a second subregion in the image with structures of interest, and to carry out a brightness adjustment of the image,
wherein the control and evaluation unit is further configured to determine a respective brightness distribution for the first subregions, to determine a selection of those first subregions that correspond to the second subregion, to generate a common brightness distribution of the second subregion from the brightness distributions of the first subregions of the selection, and to use the common brightness distribution to carry out the brightness adjustment for the second subregion,
wherein the control and evaluation unit is configured to spread a range of brightness of the common brightness distribution to a larger range of possible brightness values of the image for brightness adjustment,
and wherein the control and evaluation unit is configured to determine the range of brightness of the common brightness distribution based on at least one of a smallest and largest occurring brightness value of the brightness distribution and maxima of the brightness distribution.

* * * * *